United States Patent
Lee

(10) Patent No.: US 12,549,106 B2
(45) Date of Patent: Feb. 10, 2026

(54) POWER CONVERTER AND FEEDBACK CONTROL METHOD THEREOF

(71) Applicant: CHICONY POWER TECHNOLOGY CO., LTD., New Taipei (TW)

(72) Inventor: Min-Han Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 200 days.

(21) Appl. No.: 18/518,734

(22) Filed: Nov. 24, 2023

(65) Prior Publication Data

US 2025/0112558 A1    Apr. 3, 2025

(30) Foreign Application Priority Data

Oct. 3, 2023   (TW) .................. 112137947

(51) Int. Cl.
  *H02M 3/335*   (2006.01)
  *H02M 1/00*   (2006.01)

(52) U.S. Cl.
  CPC ..... *H02M 3/33507* (2013.01); *H02M 1/0009* (2021.05); *H02M 1/0032* (2021.05)

(58) Field of Classification Search
  CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515;

(Continued)

(56) References Cited

U.S. PATENT DOCUMENTS 7,463,497 B2    12/2008   Negrete
7,639,517 B2    12/2009   Zhou et al.
(Continued)

FOREIGN PATENT DOCUMENTS

CN   106026712 A   10/2016
CN   112104234 A   12/2020
(Continued)

OTHER PUBLICATIONS

Office Action dated Mar. 29, 2024 of the corresponding Taiwan patent application No. 112137947.

*Primary Examiner* — Jeffrey A Gblende
(74) *Attorney, Agent, or Firm* — MUNCY, GEISSLER, OLDS & LOWE, P.C.

(57) ABSTRACT

A power converter includes a primary-side circuit, a primary-side controller, a primary-side winding circuit, a secondary-side circuit, a secondary-side controller, and a first optocoupler. The primary-side controller generates a first control signal according to a first feedback signal, and the primary-side winding circuit provides a second feedback signal. The secondary-side controller generates the first feedback signal according to a DC output signal, and the first optocoupler provides the first feedback signal to the primary-side controller. The primary-side controller provides the first control signal to control the primary-side circuit according to the first feedback signal, and when the primary-side controller realizes that an output current of the power converter is lower than a current threshold, the primary-side controller generates the first control signal according to the second feedback signal.

4 Claims, 15 Drawing Sheets

(58) Field of Classification Search
CPC ......... H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | | |
|---|---|---|---|
| 8,059,429 B2* | 11/2011 | Huynh | H02M 3/33507 |
| | | | 363/21.12 |
| 8,873,254 B2 | 10/2014 | Morris et al. | |
| 10,079,540 B2* | 9/2018 | Leisten | H02M 3/158 |
| 11,190,095 B2* | 11/2021 | Yang | H02M 3/33523 |
| 11,281,272 B2* | 3/2022 | Lee | H02M 1/0032 |
| 11,569,734 B2* | 1/2023 | Peng | H02M 3/33523 |
| 11,737,189 B1 | 8/2023 | Price et al. | |
| 11,955,895 B2* | 4/2024 | Li | H02M 3/33523 |
| 2012/0301172 A1* | 11/2012 | Odate | G03G 15/80 |
| | | | 399/88 |
| 2019/0058387 A1 | 2/2019 | Shimura et al. | |
| 2022/0014090 A1 | 1/2022 | Hatano | |
| 2022/0094270 A1 | 3/2022 | Finkel | |
| 2022/0329163 A1 | 10/2022 | Yan et al. | |

FOREIGN PATENT DOCUMENTS

| | | |
|---|---|---|
| CN | 114552945 A | 5/2022 |
| CN | 115037164 A | 9/2022 |
| CN | 116526860 A | 8/2023 |
| TW | 201138279 A | 11/2011 |
| TW | I379181 B | 12/2012 |
| TW | I380151 B | 12/2012 |
| TW | 202103416 A | 1/2021 |
| TW | 202147762 A | 12/2021 |

* cited by examiner

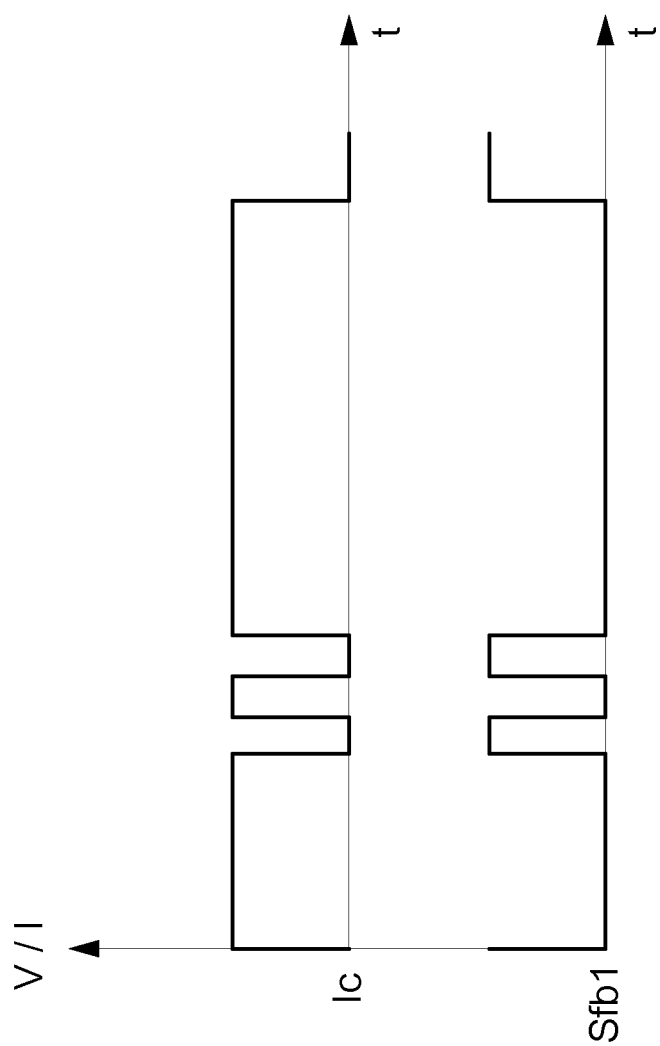

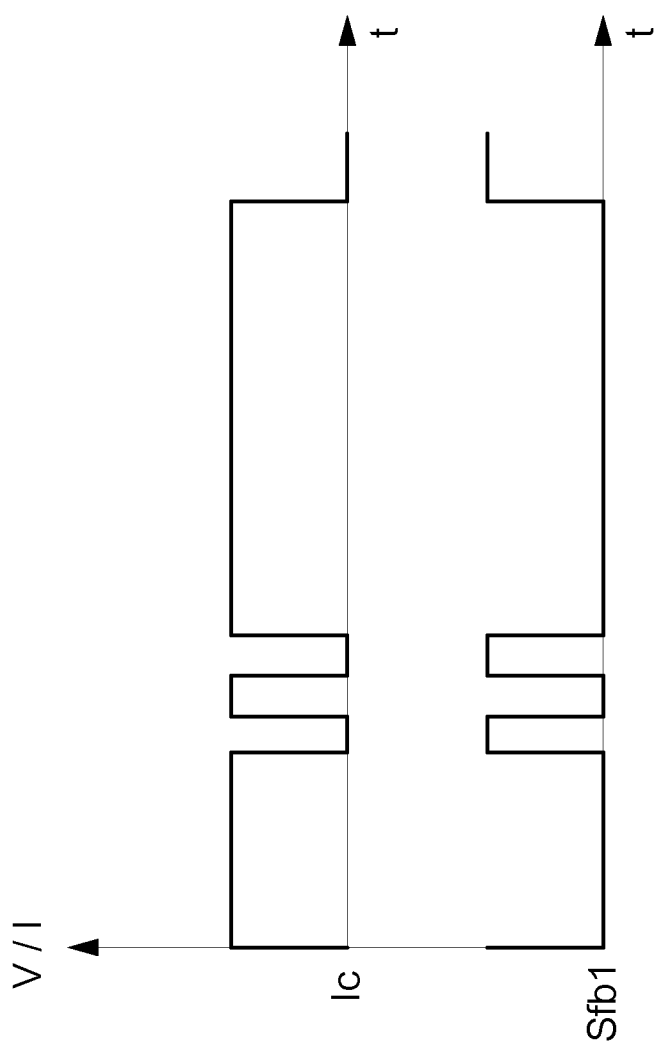

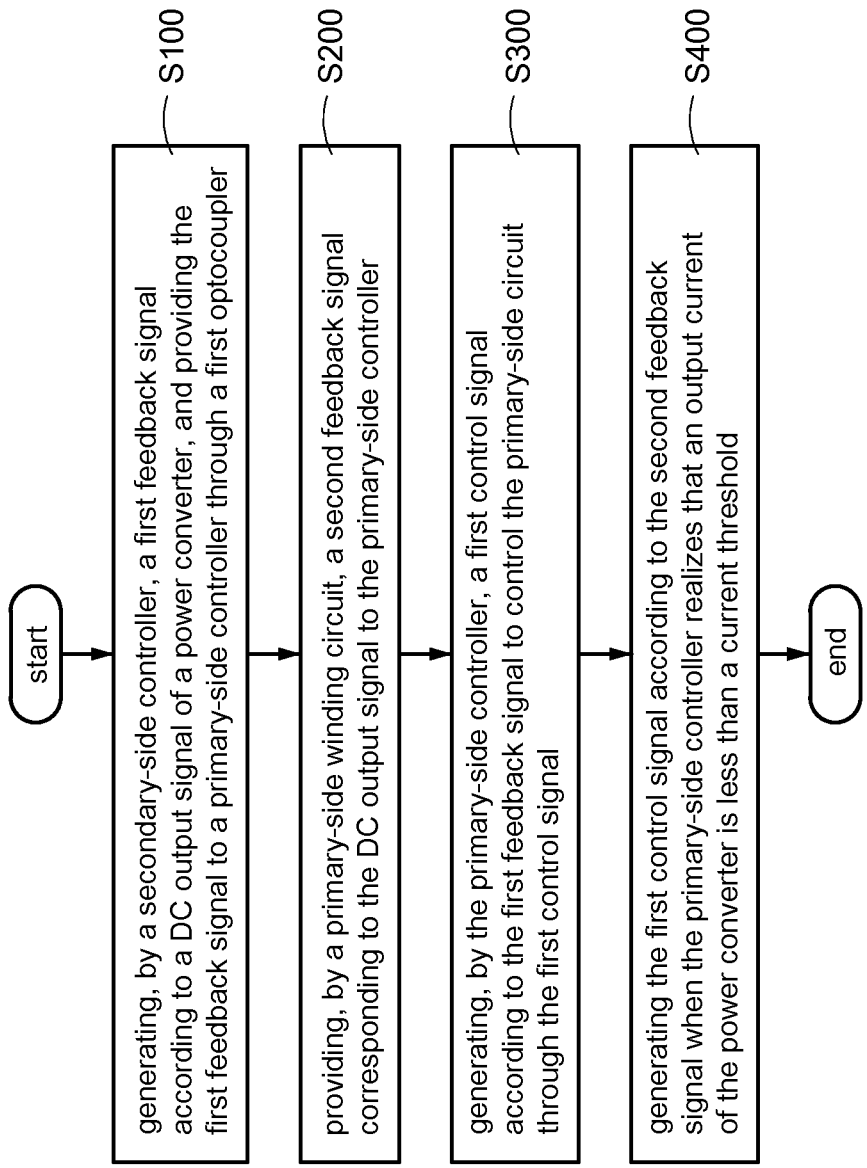

POWER CONVERTER AND FEEDBACK CONTROL METHOD THEREOF

BACKGROUND

Technical Field

The present disclosure relates to a power converter and a feedback control method thereof, and more particularly to a power converter with loss reduction control and a feedback control method thereof.

Description of Related Art

The statements in this section merely provide background information related to the present disclosure and do not necessarily constitute prior art.

With the rapid development of the information industry, power converters have played an indispensable role. Power converters generally use an isolated converter to electrically isolate an input terminal and an output terminal of the power converter to prevent an abnormal input power from affecting the load coupled to the back end. In the basic circuit of the power converter, many circuits with increased performance have been derived due to the development of high efficiency and high power (wattage), especially as today's electronic circuit development pays more and more attention to power consumption and efficiency. In order to further increase the performance of the power converter, the power consumption of the power converter must be further reduced.

However, under light-load condition or no-load conditions, traditional power converters often use an operation method of reducing the operation frequency of the primary-side controller or even entering a burst mode to minimize the operation time of the primary-side controller, thereby reducing the loss of the power converter. However, the mentioned-above operation method still requires detecting the feedback on the secondary side to confirm whether the output power meets the requirements. Therefore, the circuits, controllers, and other components on the secondary side are still forced to continuously operate to avoid being unable to control the output power well due to a lack of continuous detection of the output power.

In the field of power conversion technology, there is an increasing emphasis on the need for power converters to possess energy-saving and low-consumption features. Therefore, how to design a power converter and a feedback control method thereof to reduce the power consumption of the power converter when operating at a light-load condition or a no-load condition by changing the feedback mode of the power converter has become a critical topic in this field.

SUMMARY

In order to solve the mentioned-above problems, the present disclosure provides a power converter. The power converter includes a primary-side circuit, a primary-side controller, a primary-side winding circuit, a secondary-side circuit, a secondary-side controller, and a first optocoupler. The primary-side controller is coupled to the primary-side circuit, and generates a first control signal according to a first feedback signal. The primary-side winding circuit is coupled to the primary-side controller, and generates a second feedback signal. The secondary-side controller is coupled to the secondary-side circuit, and generates the first feedback signal according to a DC output signal. The first optocoupler is coupled to the secondary-side controller and the primary-side controller, and provides the first feedback signal to the primary-side controller. The primary-side controller provides the first control signal to control the primary-side circuit according to the first feedback signal, and when the primary-side controller realizes that an output current of the power converter is less than a current threshold, the primary-side controller generates the first control signal according to the second feedback signal.

In order to solve the mentioned-above problems, the present disclosure provides a feedback control method of a power converter. The power converter includes a primary-side circuit, a primary-side controller, a primary-side winding circuit, a secondary-side controller, and a first optocoupler. The feedback control method comprising steps of: generating, by the secondary-side controller, a first feedback signal according to a DC output signal of the power converter, and providing the first feedback signal to the primary-side controller through the first optocoupler; providing, by the primary-side winding circuit, a second feedback signal corresponding to the DC output signal to the primary-side controller; generating, by the primary-side controller, a first control signal according to a first feedback signal to control the primary-side circuit through the first control signal; generating the first control signal according to the second feedback signal when the primary-side controller realizes that an output current of the power converter is less than a current threshold.

The main purpose and effect of the present disclosure is that when the primary-side controller realizes that the output current of the power converter is lower than the current threshold, the primary-side winding circuit is used instead the primary-side controller to receive the second feedback signal corresponding to the auxiliary voltage so that the primary-side controller generates the first control signal for controlling the primary-side circuit according to the second feedback signal, thereby maintaining the stability of the output power source. Therefore, the power converter can reduce the power consumption of the power converter by changing the feedback method.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 4B is a signal waveform diagram of the power converter operating in the feedback control according to the third embodiment of the present disclosure.

FIG. 5B is a signal waveform diagram of the power converter operating in the feedback control according to the fourth embodiment of the present disclosure.

FIG. 9 is a flowchart of a feedback control method of the power converter according to the present disclosure.

DETAILED DESCRIPTION

Figure 1A:
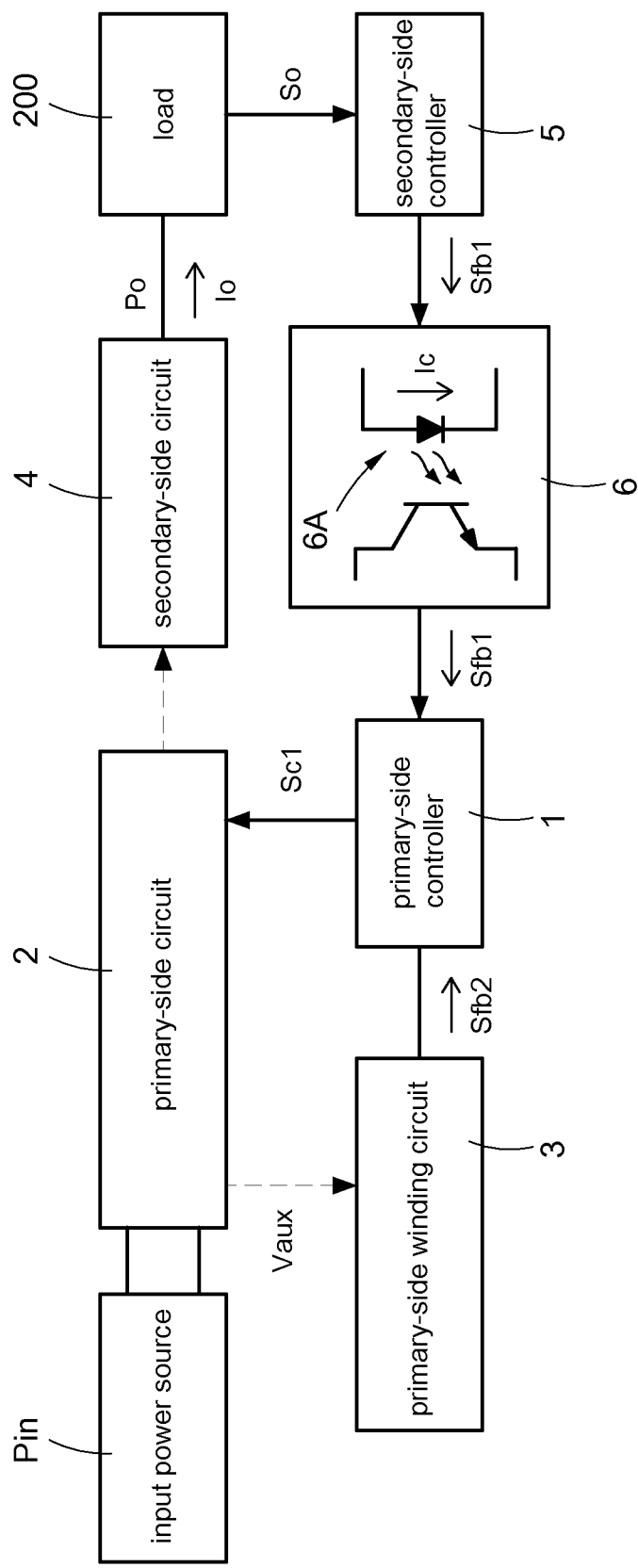
FIG. 1A is a block circuit diagram of a power converter with loss reduction control according to the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a block circuit diagram of a power converter with loss reduction control according to the present disclosure. The power converter 100 receives an input power source Pin and is coupled to a load 200, and the power converter 100 converts the input power source Pin into an output power source Po to supply power to the load 200. The power converter 100 may be an isolated conversion circuit, for example but not limited to, a flyback circuit, a forward circuit, etc. The power converter 100 includes a primary-side controller 1, a primary-side circuit 2, a primary-side winding circuit 3, a secondary-side circuit 4, a secondary-side controller 5, and a first optocoupler 6. The primary-side controller 1 can receive the input power source Pin by, for example, but not limited to, coupling to a front-stage circuit (not shown), or coupling to the input power source. The primary-side controller 1 is coupled to the primary-side circuit 2, and generates a first control signal Sc1 to control the primary-side circuit 2 according to a first feedback signal Sfb1. A first terminal of the secondary-side circuit 4 is coupled to the primary-side circuit 2, and a second terminal of the secondary-side circuit 4 is coupled to the load 200 to provide the output power source Po to supply power to the load 200. The secondary-side controller 5 is coupled to the secondary-side circuit 4, and generates the first feedback signal Sfb1 according to a DC output signal So corresponding to the output power source Po. The first optocoupler 6 is coupled to the secondary-side controller 5 and the primary-side controller 1, and provides the first feedback signal Sfb1 to the primary-side controller 1. The primary-side winding circuit 3 is coupled to the primary-side controller 1, and provides an auxiliary voltage Vaux to supply power to the primary-side controller 1. In one embodiment, the "power source" used herein may refer to at least one of voltage, current, and power. For example, but not limited to, the "output power source Po" may refer to at least one of output voltage, output current, and output power. Therefore, the "DC output signal So corresponding to the output power source Po" can be expressed as the DC output signal So can correspond to at least one of the output voltage, output current, and output power, and so on, which will not be described again here.

When the power converter 100 receives the input power source Pin, the primary-side controller 1 performs high-voltage startup based on the input power source Pin. After the high-voltage startup, the primary-side controller 1 starts to provide the first control signal Sc1 to the primary-side circuit 2 so that the primary-side circuit 2 converts the energy of the input power source Pin. Afterward, the primary-side circuit 2 couples the converted energy to the primary-side winding circuit 3 so that the primary-side winding circuit 3 provides the auxiliary voltage Vaux to the primary-side controller 1 to complete the startup of the primary-side controller 1, that is, the power required for the primary-side controller 1 is supplied by the auxiliary voltage Vaux, rather than being supplied by the input power source Pin. The primary-side circuit 2 also couples the converted energy to the secondary-side circuit 4. The secondary-side controller 5 receives the energy coupled to the secondary-side circuit 4 to operate, and controls the secondary-side circuit 4 to convert the energy coupled to the secondary-side circuit 4 into the output power source Po. The secondary-side controller 5 generates the first feedback signal Sfb1 according to the DC output signal So corresponding to the output power source Po. The secondary-side controller 5 transmits the first feedback signal Sfb1 to the primary-side controller 1 through the first optocoupler 6 so that the primary-side controller 1 adjusts the first control signal Sc1 that controls the primary-side circuit 2 according to the first feedback signal Sfb1. Therefore, the power converter 100 is controlled by the adjusted first control signal Sc1 to stably provide the output power source Po.

For example, it is assumed that the output power source Po is changed from 5V (volts) and 3 A (amperes) to 5V and 1 A. In this condition, the energy transferred from the primary-side circuit 2 to the secondary-side circuit 4 is excessive, and a current Ic flowing through the optocoupler diode 6A of the first optocoupler 6 becomes larger, which increases the brightness of the optocoupler diode 6A so that the voltage received by the primary-side controller 1 is pulled low to notify the primary-side controller 1 to decrease the energy transmitted to the secondary-side circuit 4. On the contrary, when the output power source Po is changed from 5V and 1 A to 5V and 3 A, the energy transferred from the primary-side circuit 2 to the secondary-side circuit 4 is insufficient, and the current Ic flowing through the optocoupler diode 6A becomes smaller, which decreases the brightness of the optocoupler diode 6A so that the voltage received by the primary-side controller 1 is pulled high to notify the primary-side controller 1 to increase the energy transmitted to the secondary-side circuit 4. Therefore, when the power converter 100 receives the input power source Pin, the power converter 100 activates the primary-side controller 1 and the secondary-side controller 5 to perform the conventional feedback control and provide the conventional output power source Po.

In order to reduce the power consumption of the power converter 100 when operating in the light-load condition or the no-load condition, the power converter 100 of the present disclosure changes the feedback method of the power converter 100 when operating in the light-load condition. Specifically, after the power converter 100 receives the input power source Pin and causes the primary-side controller 1 and the secondary-side controller 5 to normally start, the secondary-side controller 5 will provide at least once or a short period of time (for example, but not limited to, 3-5 μs) to the primary-side controller 1 (i.e., a conventional feedback control). Afterward, when the primary-side controller 1 realizes that the output current Io of the power converter is less than the current threshold, it means that the power converter 100 operates in the light-load condition or the no-load condition, and the power converter 100 can reduce the power consumption thereof by changing the feedback manner.

Since the auxiliary voltage Vaux has a linear relationship with the output power source Po, the primary-side controller 1 can receive the second feedback signal Sfb2 corresponding to the auxiliary voltage Vaux from the primary-side winding circuit 3 so that the primary-side controller 1 can generate the first control signal Sc1 according to the second feedback signal Sfb2. In one embedment, the present disclosure may include a variety of feedback control methods in which the primary-side controller 1 can realize that the power converter 100 operates in the light-load condition or the no-load condition, which will be further described later and will not be described in detail here.

On the other hand, when the output current Io is lower than the current threshold, the secondary-side controller 5 can selectively enter a sleep state or a shutdown state. Therefore, the first optocoupler 6 can be disabled to avoid the power consumption of the first optocoupler 6 when the power converter 100 operates in the light-load condition or the no-load condition. Also, the power consumption of the secondary-side controller 5 can be saved when the power converter 100 operates in the light-load condition or the no-load condition. In particular, the sleep state means that the unused pins of the secondary-side controller 5 are disabled. For example, but not limited to, the pin coupled to the first optocoupler 6, the pin coupled to the secondary-side circuit 4 to receive the DC output signal So, and/or pins for detecting voltage and current signals, etc. are disabled. The shutdown state means that all components (except for the pin that receives power, and the switch (not shown) for connecting/disconnecting power to the secondary-side controller) inside the secondary-side controller 5 do not operate, causing the secondary-side controller 5 to be temporarily shut down.

In one embodiment, when the primary-side controller 1 receives the second feedback signal Sfb2, the primary-side controller 1 can disable the pin coupled to the first optocoupler 6 to save power consumption of the primary-side controller 1. In addition, in one embodiment, when the power converter 100 does not operate in the light-load condition or the no-load condition, the primary-side controller 1 can selectively enable or disable the pin of receiving the second feedback signal Sfb2. When the pin of receiving the second feedback signal Sfb2 is enabled, the primary-side controller 1 can monitor the output power source Po through the second feedback signal Sfb2. On the contrary, when the pin of receiving the second feedback signal Sfb2 is disabled, the power consumption of the primary-side controller 1 can be saved.

Figure 1B:
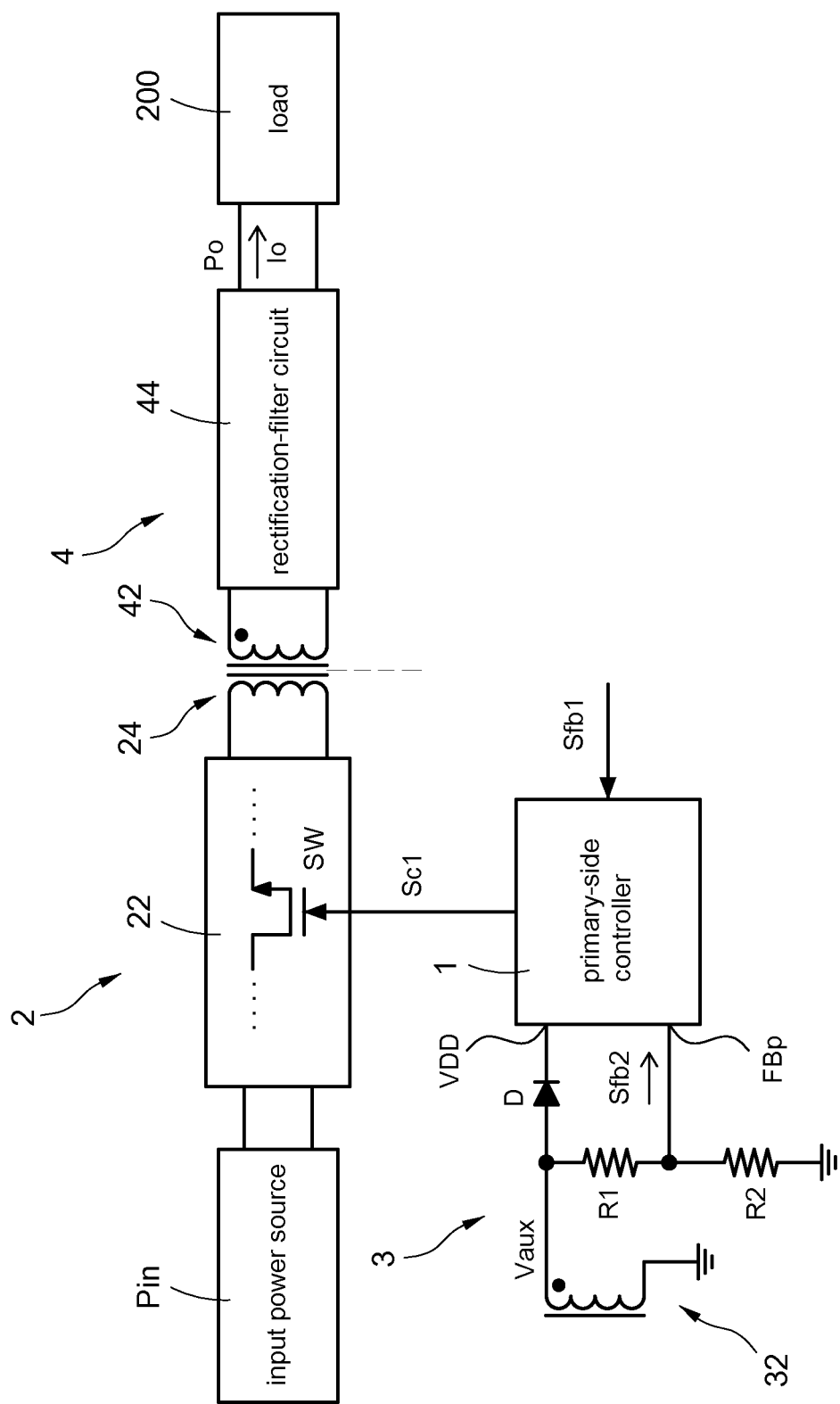
FIG. 1B is a detailed block circuit diagram of the power converter with loss reduction control according to the present disclosure.

Please refer to FIG. 1B, which shows a detailed block circuit diagram of the power converter with loss reduction control according to the present disclosure, and also refer to FIG. 1A. The primary-side circuit 2 includes an AC-to-DC circuit 22 and a primary-side coil 24, and the secondary-side circuit 4 includes a secondary-side coil 42 and a rectification-filter circuit 44. The primary-side coil 24 is coupled to the secondary-side coil 42 to form an isolated transformer. The AC-to-DC circuit 22 receives the input power source Pin and is coupled to the primary-side coil 24. The AC-to-DC circuit 22 includes at least one power switch SW. The primary-side controller 1 controls the power switch SW through the first control signal Sc1 to convert the input power source Pin, and the converted energy is provided by a coupling manner through the primary-side coil 24. The secondary-side coil 42 is coupled to the primary-side coil 24, and the rectification-filter circuit 44 is coupled to the secondary-side coil 42 and the secondary-side controller 5. The secondary-side controller 5 controls the rectification-filter circuit 44 to rectify and filter the energy coupled from the primary-side coil 24 to the secondary-side coil 42 to generate the output power source Po.

The primary-side winding circuit 3 includes an auxiliary winding 32, a voltage division circuit R1, R2, and a diode D. The auxiliary winding 32 is coupled to the primary-side coil 24. The voltage division circuit R1, R2 is connected to the auxiliary winding 32 in parallel, and the voltage division circuit R1, R2 includes a first resistor R1 and a second resistor R2. A primary-side feedback terminal FBp of the primary-side controller 1 is coupled between the first resistor R1 and the second resistor R2. When the auxiliary winding 32 receives the auxiliary voltage Vaux coupled from the primary-side coil 24, the voltage division circuit R1, R2 divides the auxiliary voltage Vaux to generate a second feedback signal Sfb2 at a node between the first resistor R1 and the second resistor R2 so as to provide the second feedback signal Sfb2 to the primary-side feedback terminal FBp of the primary-side controller 1. The diode D is coupled to the first resistor R1 and a power terminal VDD of the primary-side controller 1, and the auxiliary voltage Vaux prevents negative voltage from being transmitted to the power terminal VDD of the primary-side controller 1 through the reverse bias of the diode D.

Figure 2A:
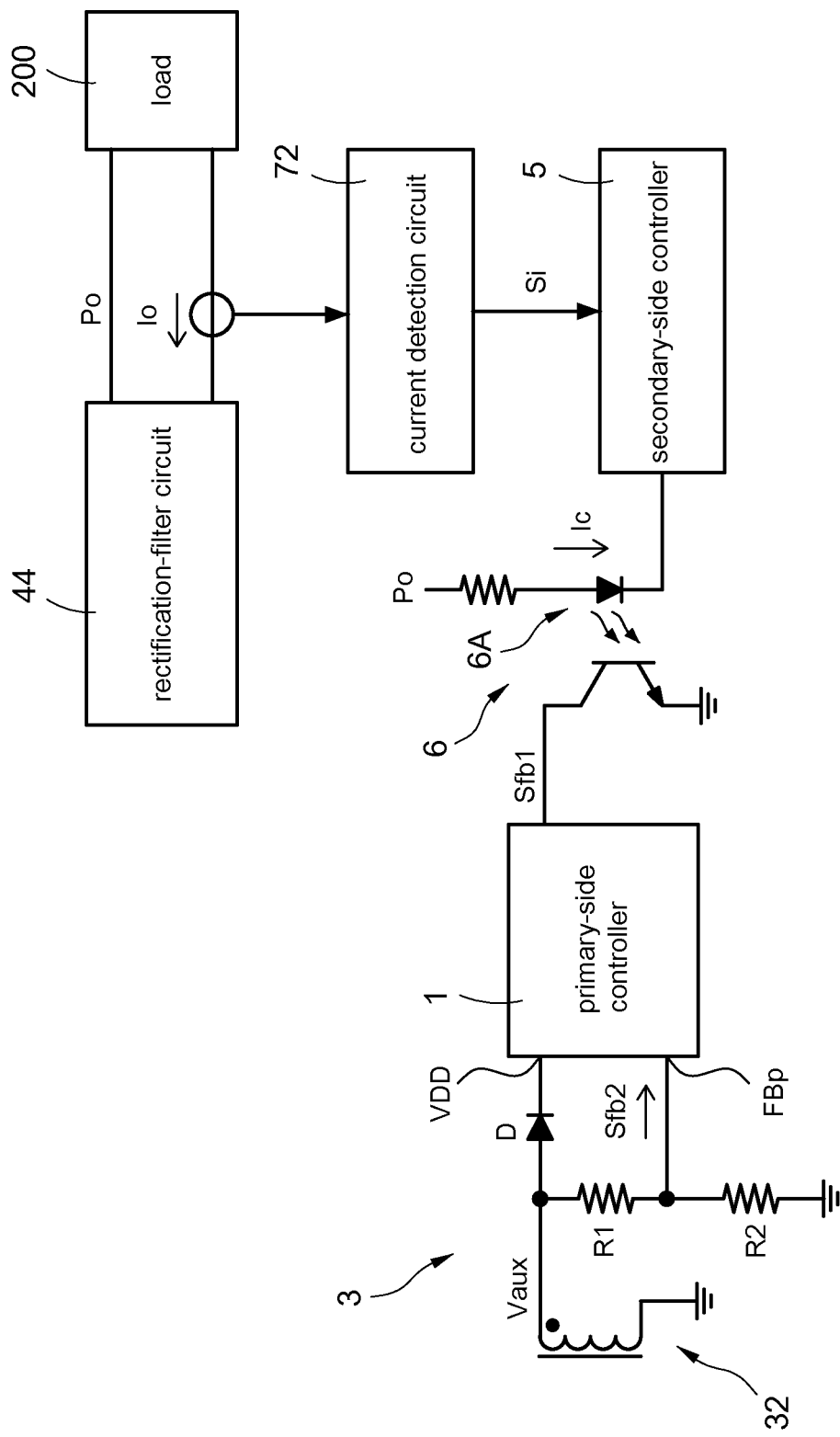
FIG. 2A is a block diagram of the power converter operating in a feedback control according to a first embodiment of the present disclosure.
Figure 2B:
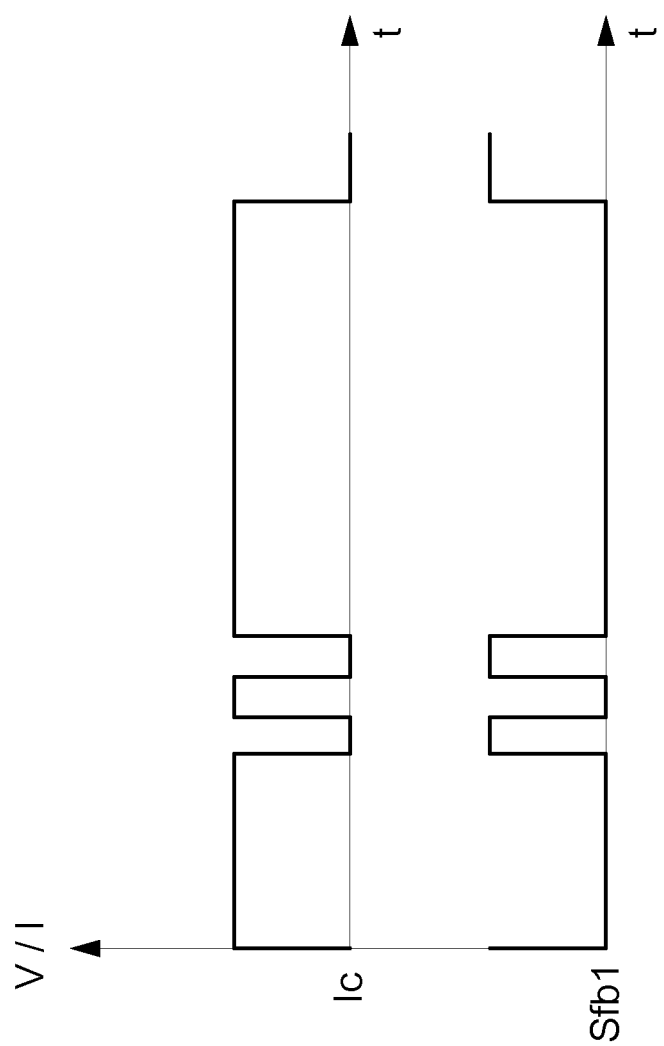
FIG. 2B is a signal waveform diagram of the power converter operating in the feedback control according to the first embodiment of the present disclosure.

Please refer to FIG. 2A, which shows a block diagram of the power converter operating in a feedback control according to a first embodiment of the present disclosure; please refer to FIG. 2B, which shows a signal waveform diagram of the power converter operating in the feedback control according to the first embodiment of the present disclosure, and also refer to FIG. 1A and FIG. 1B. In FIG. 2A, the power converter 100 further includes a current detection circuit 72. The current detection circuit 72 is coupled to the rectification-filter circuit 44 and the secondary-side controller 5. When the rectification-filter circuit 44 provides the output power source Po, the current detection circuit 72 detects an output current Io flowing through a path between the rectification-filter circuit 44 and load 200 to correspondingly provide a current signal Si. The secondary-side controller 5 receives the current signal Si and determines whether the output current Io is less than a current threshold according to the current signal Si.

When the secondary-side controller 5 determines that the output current Io is less than the current threshold according to the current signal Si, the secondary-side controller 5 adjusts, for example, but is not limited to, the current Ic flowing through the optocoupler diode 6A to transmit the first feedback signal Sfb1 of the continuous pulse (or the specific signal) shown in FIG. 2B to notify the primary-side controller 1. After transmitting the first feedback signal Sfb1 of the continuous pulse (or the specific signal), the secondary-side controller 5 enters the sleep state or the shutdown state to disable the first optocoupler 6. When the primary-side controller 1 receives the first feedback signal Sfb1 of a continuous pulse (or a specific signal) shown in FIG. 2B, the primary-side feedback terminal FBp of the primary-side controller 1 receives the second feedback signal Sfb2, and adjusts the first control signal Sc1 according to the second feedback signal Sfb2.

On the contrary, when the secondary-side controller 5 determines that the output current Io is not less than the current threshold or the output current Io increase from below the current threshold to above the current threshold according to the current signal Si, the secondary-side controller 5 and the first optocoupler 6 enter an enabled state. Therefore, the primary-side controller 1 correspondingly provides the first feedback signal Sfb1 according to the output power source Po so that the primary-side controller 1 can adjust the first control signal Sc1 according to the first feedback signal Sfb1. When the secondary-side controller 5 returns to the enabled state from the sleep state or the shutdown state, the secondary-side controller 5 can also transmit the first feedback signal Sfb1 of the continuous pulse (or the specific signal) shown in FIG. 2B to notify the primary-side controller 1 so that the primary-side controller 1 performs corresponding control, for example, but not limited to, disabling the primary-side feedback terminal FBp.

Figure 3A:
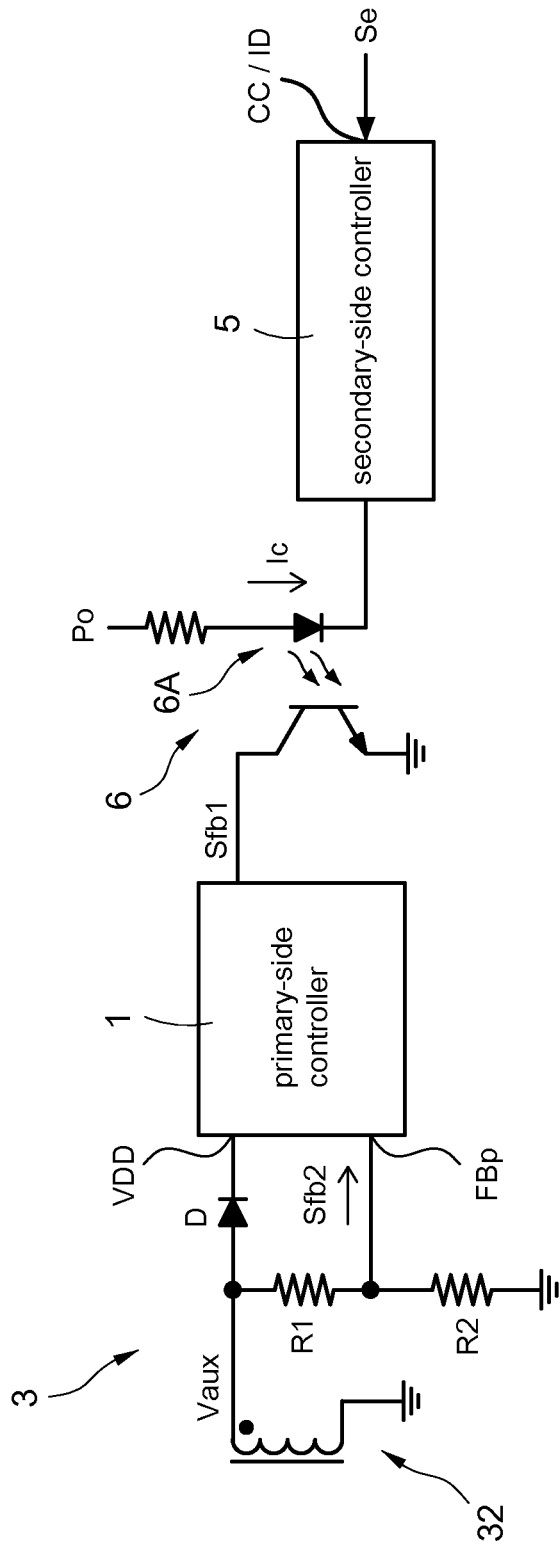
FIG. 3A is a block diagram of the power converter operating in a feedback control according to a second embodiment of the present disclosure.
Figure 3B:
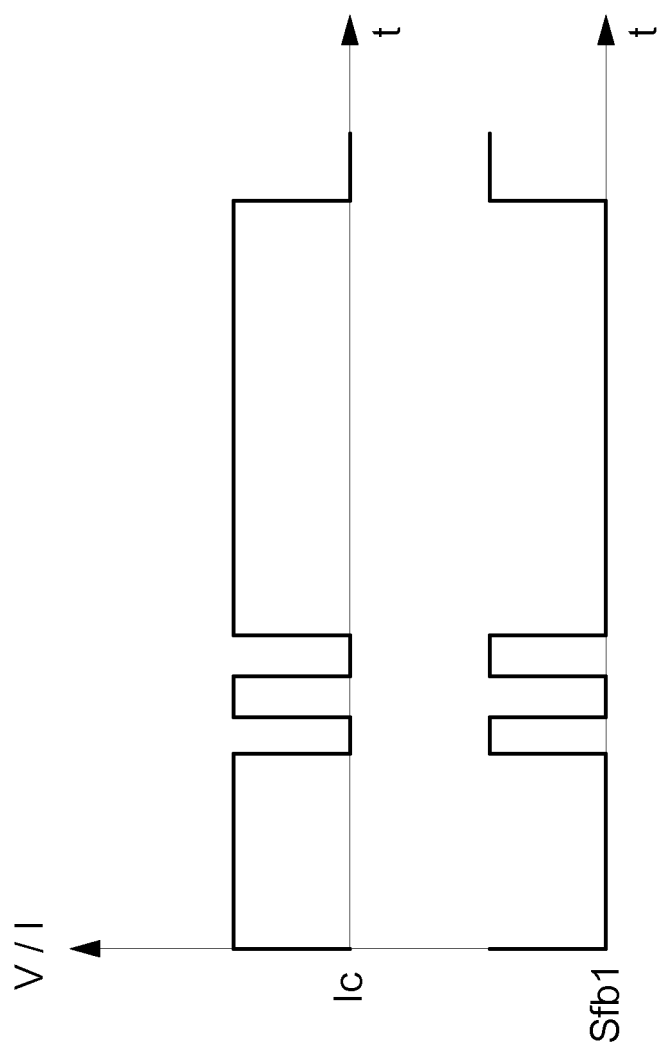
FIG. 3B is a signal waveform diagram of the power converter operating in the feedback control according to the second embodiment of the present disclosure.

Please refer to FIG. 3A, which shows a block diagram of the power converter operating in a feedback control according to a second embodiment of the present disclosure; please refer to FIG. 3B, which shows a signal waveform diagram of the power converter operating in the feedback control according to the second embodiment of the present disclosure, and also refer to FIG. 1A to FIG. 2B. In FIG. 3A, an external apparatus, for example, but not limited to, an external or upper-level apparatus such as the load 200, a system side, or so on provides an external signal Se to the secondary-side controller 5 (such as, but not limited to, a CC/ID pin of the secondary-side controller 5 to notify the secondary-side controller 5 that it needs to enter a low-loss mode. Afterward, the secondary-side controller 5 notifies the primary-side controller 1 through the first feedback signal Sfb1 of the continuous pulse (or the specific signal) shown in FIG. 3B so that the primary-side feedback terminal FBp of the primary-side controller 1 receives the second feedback signal Sfb2. In particular, the subsequent descriptions of operation methods and signal waveforms of the primary-side controller 1 and the secondary-side controller 5 in FIG. 3A and FIG. 3B may be similar to those shown in FIG. 2A and FIG. 2B, and will not be described again here.

Figure 4A:
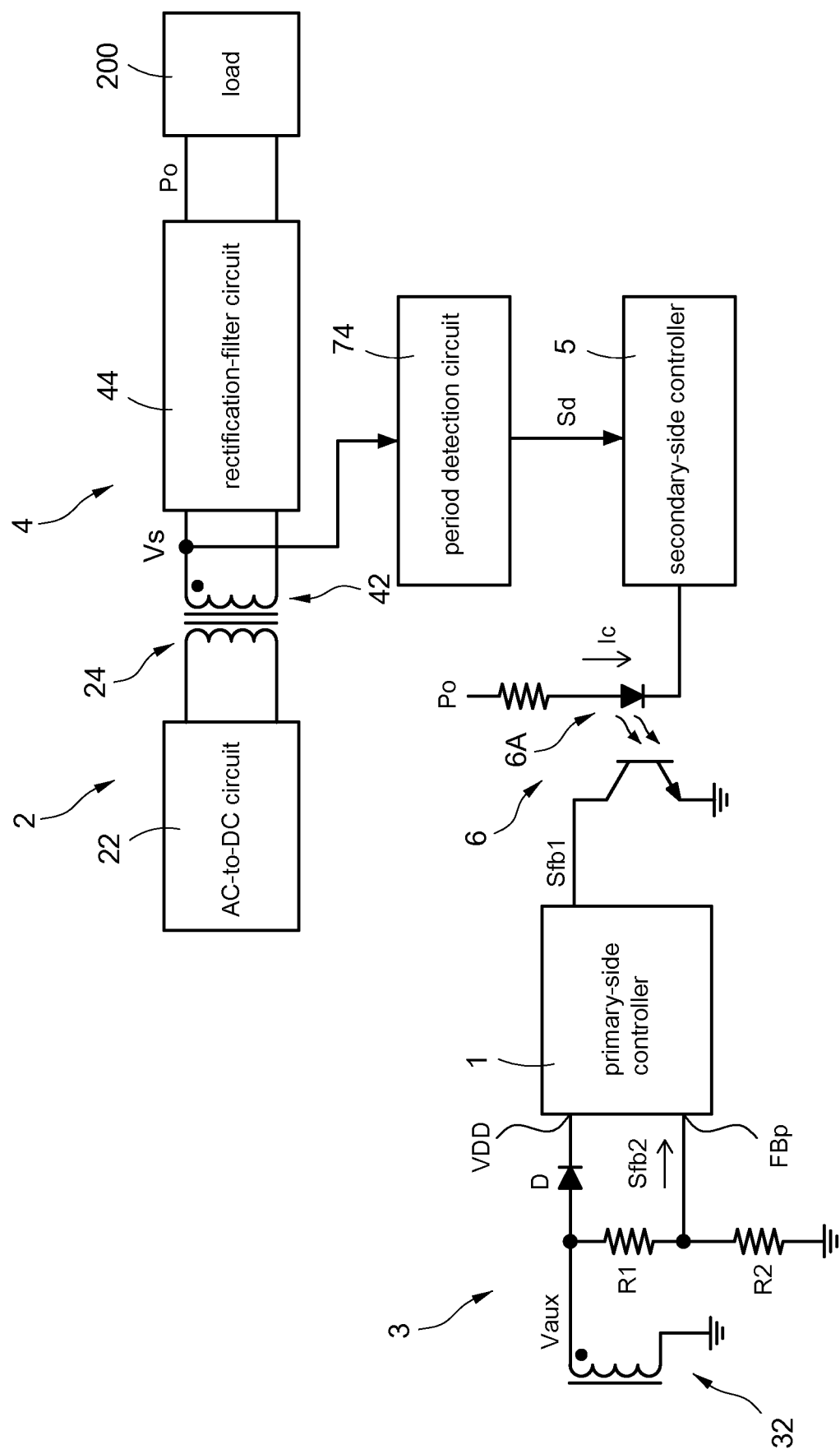
FIG. 4A is a block diagram of the power converter operating in a feedback control according to a third embodiment of the present disclosure.

Please refer to FIG. 4A, which shows a block diagram of the power converter operating in a feedback control according to a third embodiment of the present disclosure; please refer to FIG. 4B, which a signal waveform diagram of the power converter operating in the feedback control according to the third embodiment of the present disclosure, and also refer to FIG. 1A to FIG. 3B. In FIG. 4A, the power converter 100 further includes a period detection circuit 74, and the period detection circuit 74 is coupled between the secondary-side coil 42, the rectification-filter circuit 44, and the secondary-side controller 5. When the secondary-side coil 42 receives the energy coupled from the primary-side coil 24, the period detection circuit 74 detects a voltage conduction period of a secondary-side voltage Vs of the secondary-side coil 42 to correspondingly provide a period signal Sd. The secondary-side controller 5 receives the period signal Sd, and determines whether the output current Io is less than the current threshold according to the period signal Sd. Moreover, since the voltage conduction period of the secondary-side voltage Vs of the secondary-side coil 42 has a linear relationship with the magnitude of the output current Io in the secondary side of some power converters, when the output current Io is larger, the voltage conduction period of the secondary-side voltage Vs of the secondary-side coil 42 is larger, and vice versa. Therefore, the secondary-side controller 5 can determine whether the output current Io is less than the current threshold according to the period signal Sd. In particular, the subsequent descriptions of operation methods and signal waveforms of the primary-side controller 1 and the secondary-side controller 5 in FIG. 4A and FIG. 4B may be similar to those shown in FIG. 2A and FIG. 2B, and will not be described again here.

Figure 5A:
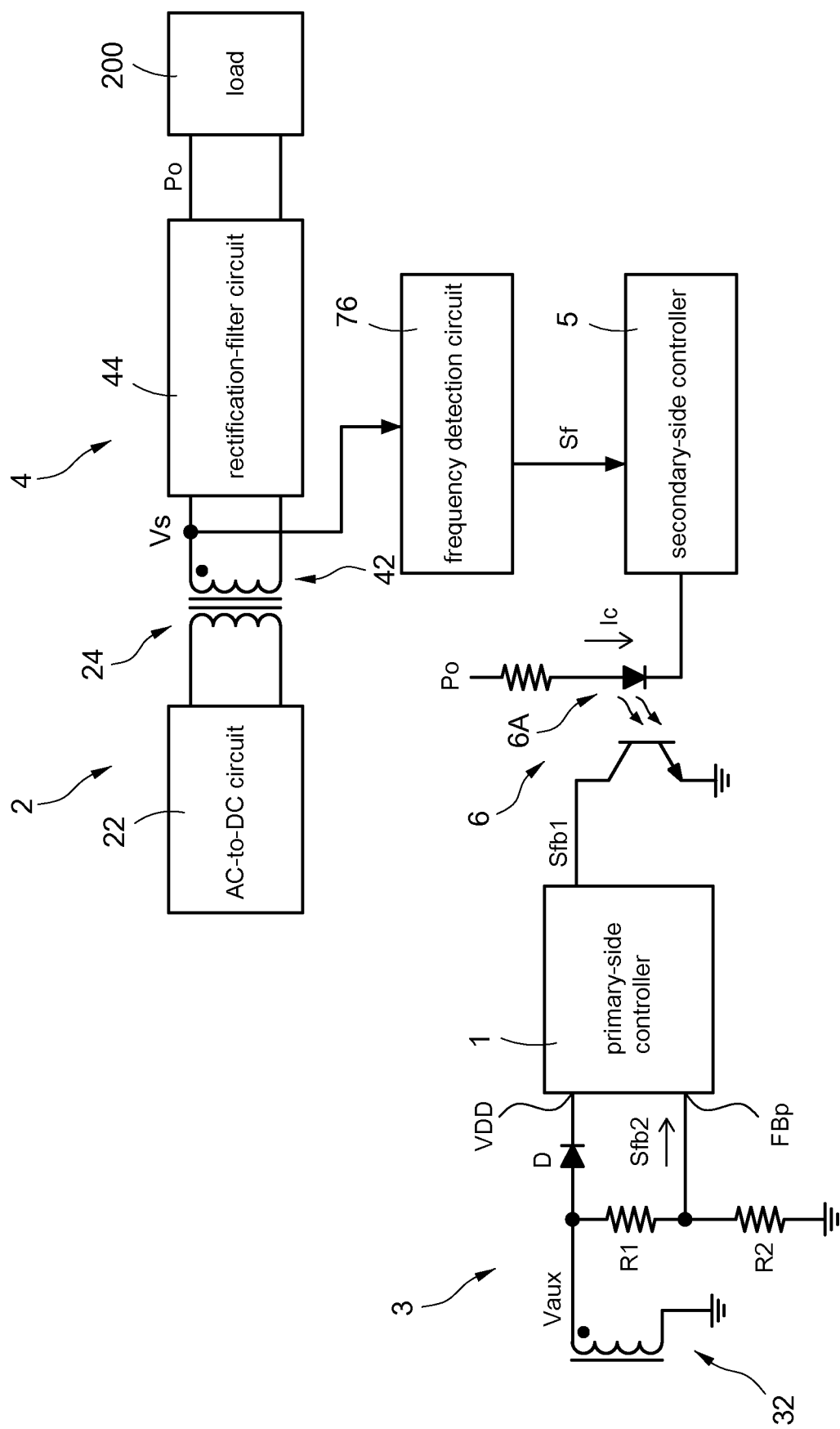
FIG. 5A is a block diagram of the power converter operating in a feedback control according to a fourth embodiment of the present disclosure.

Please refer to FIG. 5A, which shows a block diagram of the power converter operating in a feedback control according to a fourth embodiment of the present disclosure; please refer to FIG. 5B, which shows a signal waveform diagram of the power converter operating in the feedback control according to the fourth embodiment of the present disclosure, and also refer to FIG. 1A to FIG. 4B. The difference between FIG. 5A, FIG. 5B and FIG. 4A, FIG. 4B is that the period detection circuit 74 is replaced by a frequency detection circuit 76. The frequency detection circuit 76 detects a voltage switching frequency of the secondary-side voltage Vs of the secondary-side coil 42 to correspondingly provide a frequency signal Sf. The secondary-side controller 5 receives the frequency signal Sf, and determines whether the output current Io is less than the current threshold according to the frequency signal Sf. Moreover, since the voltage switching frequency of the secondary-side voltage Vs of the secondary-side coil 42 has a linear relationship with the magnitude of the output current Io in the secondary side of some power converters, when the output current Io is larger, the voltage switching frequency of the secondary-side voltage Vs of the secondary-side coil 42 is larger, and vice versa. Therefore, the secondary-side controller 5 can determine whether the output current Io is less than the current threshold according to the frequency signal Sf. In particular, the subsequent descriptions of operation methods and signal waveforms of the primary-side controller 1 and the secondary-side controller 5 in FIG. 5A and FIG. 5B may be similar to those shown in FIG. 2A and FIG. 2B, and will not be described again here.

Figure 6A:
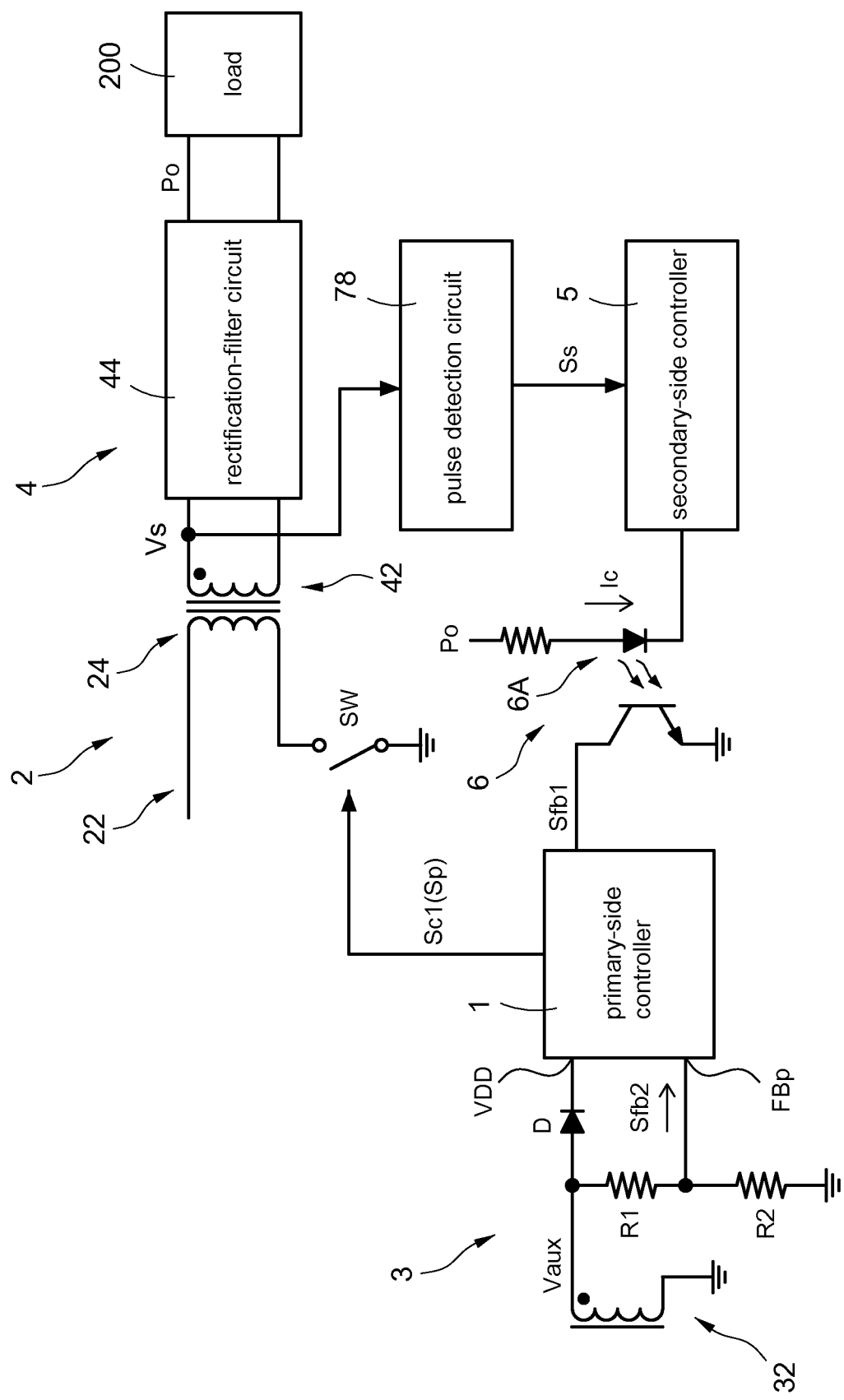
FIG. 6A is a block diagram of the power converter operating in a feedback control according to a fifth embodiment of the present disclosure.
Figure 6B:
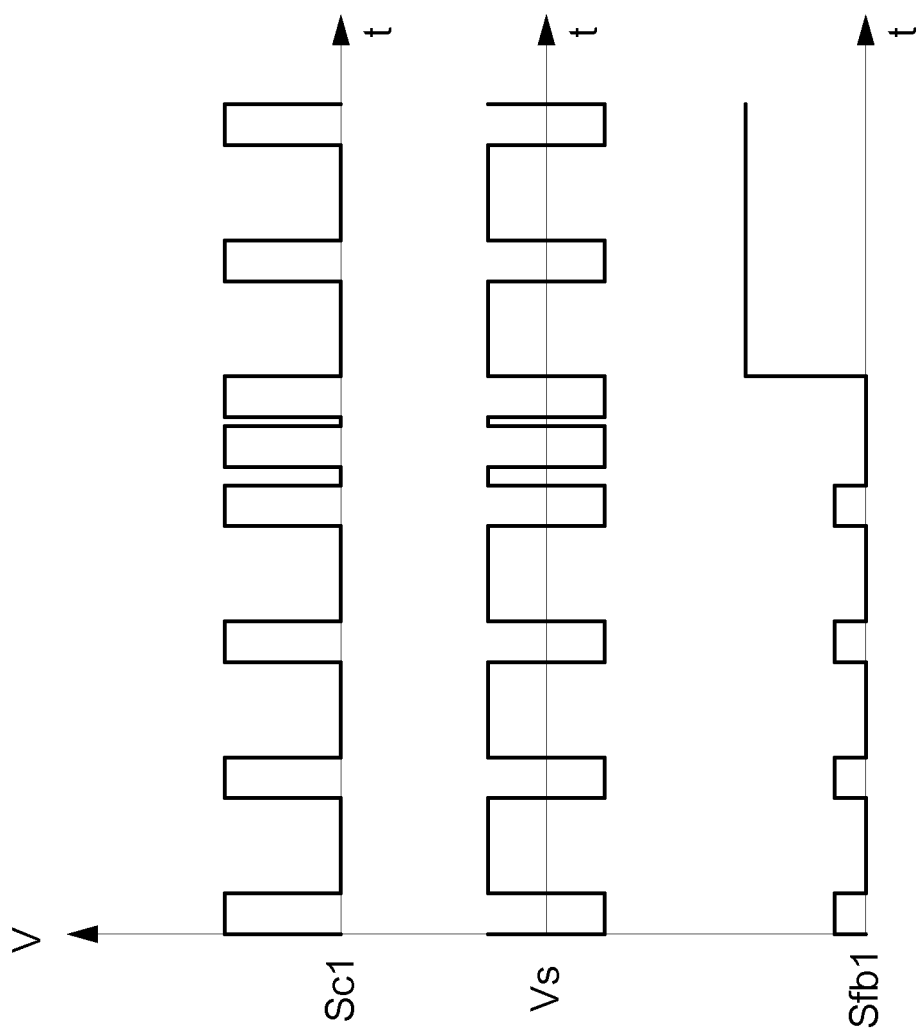
FIG. 6B is a signal waveform diagram of the power converter operating in the feedback control according to the fifth embodiment of the present disclosure.

Please refer to FIG. 6A, which shows a block diagram of the power converter operating in a feedback control according to a fifth embodiment of the present disclosure; please refer to FIG. 6B, which shows a signal waveform diagram of the power converter operating in the feedback control according to the fifth embodiment of the present disclosure, and also refer to FIG. 1A to FIG. 5B. In FIG. 6A, the power converter 100 further includes a pulse detection circuit 78, and the pulse detection circuit 78 is coupled between the secondary-side coil 42, the rectification-filter circuit 44, and the secondary-side controller 5. The power switch SW is, for example but not limited to, coupled to the primary-side coil 24 and the primary-side controller 1. When the primary-side controller 1 realizes that the output current Io is less than the current threshold according to a first voltage level of the first feedback signal Sfb1 or a second voltage level of the second feedback signal Sfb2, it means that the power converter 100 operates in a light-load condition or a no-load condition, and the power converter 100 can reduce the power consumption thereof by changing the feedback manner.

Therefore, the primary-side controller 1 controls the power switch SW through the first control signal Sc1 to generate the specific pulse shown in FIG. 6B, and the primary-side feedback terminal FBp of the primary-side controller 1 receives the second feedback signal Sfb2 to generate the first control signal Sc1. Moreover, the primary-side controller 1 adds a pulse signal Sp to the first control signal Sc1 to control the power switch SW to generate the specific pulse with a specific frequency or a specific period. In particular, the specific frequency and specific period are different from an operating frequency and an operating period of the first control signal Sc1, thereby causing the operating frequency and operating period of the first control signal Sc1 to change in a certain period of time (such as but not limited to 1 μs). The pulse detection circuit 78 receives the secondary-side voltage Vs corresponding to the first control signal Sc1 through the secondary-side coil 42 to correspondingly provide a detection signal Ss according to the specific pulse. After receiving the detection signal Ss, the secondary-side controller 5 enters the sleep state or the shutdown state to disable the first optocoupler 6.

On the contrary, when the primary-side controller 1 determines that the output current Io is not less than the current threshold or the output current Io increase from below the current threshold to above the current threshold according to the first voltage level of the first feedback signal Sfb1 or the second voltage level of the second feedback signal Sfb2, the primary-side controller 1 controls the power switch SW through the first control signal Sc1 to generate the specific pulse shown in FIG. 6B so that the secondary-side controller 5 enters the enabled state after receiving the corresponding detection signal Ss to enable the first optocoupler 6, and the primary-side controller 1 receives the first feedback signal Sfb1 provided by the first optocoupler 6.

Figure 7:
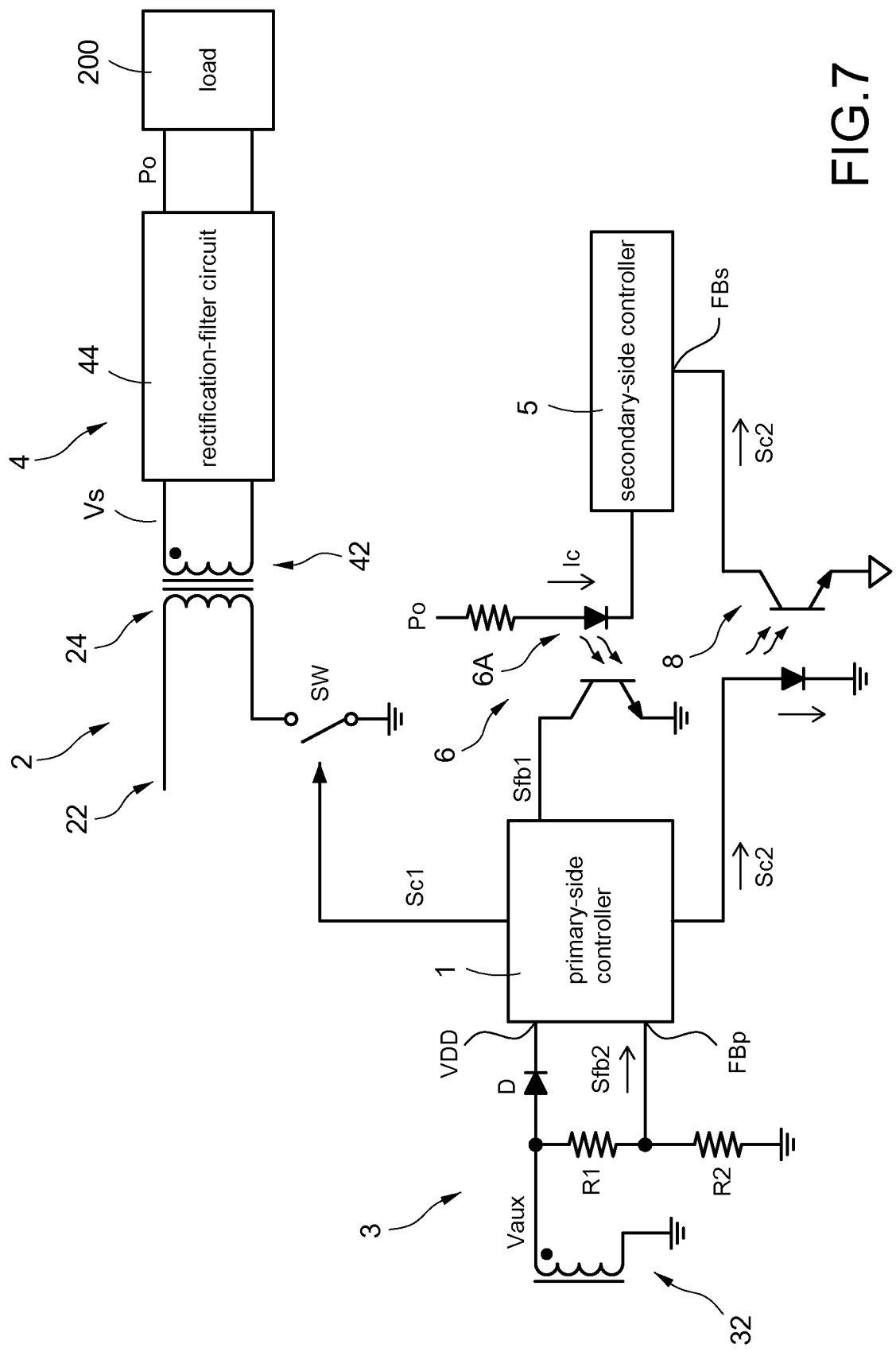
FIG. 7 is a block diagram of the power converter operating in a feedback control according to a sixth embodiment of the present disclosure.

Please refer to FIG. 7, which shows a block diagram of the power converter operating in a feedback control according to a sixth embodiment of the present disclosure, and also refer to FIG. 1A to FIG. 6B. In FIG. 7, the power converter 100 further includes a second optocoupler 8. The second optocoupler 8 is coupled to the secondary-side controller 5 and the secondary-side controller 5. When the primary-side controller 1 realizes that the output current Io is less than the current threshold according to the first voltage level of the first feedback signal Sfb1 or the second voltage level of the second feedback signal Sfb2, it means that the power converter 100 operates in a light-load condition or a no-load condition, and the power converter 100 can reduce the power consumption thereof by changing the feedback manner.

Therefore, the primary-side controller 1 provides the second control signal Sc2 to the second optocoupler 8 (for example, but not limited to, controlling the current flowing through the optocoupler diode of the second optocoupler 8 to be 0), and the primary-side feedback terminal FBp of the primary-side controller 1 receives the second feedback signal Sfb2 to generate the first control signal Sc1. The second optocoupler 8 couples the second control signal Sc2 to a signal-receiving terminal FBs of the secondary-side controller 5. After the signal-receiving terminal FBs receives the second control signal Sc2, the secondary-side controller 5 enters the sleep state or the shutdown state to disable the first optocoupler 6. Taking the current flowing through the optocoupler diode of the second optocoupler 8 being 0 as an example, the voltage received by the signal-receiving terminal FBs is at a high level, thereby causing the secondary-side controller 5 to enter the sleep state or the shutdown state accordingly.

On the contrary, when the primary-side controller 1 determines that the output current Io is not less than the current threshold or the output current Io increase from below the current threshold to above the current threshold according to the first voltage level of the first feedback signal Sfb1 or the second voltage level of the second feedback signal Sfb2, the primary-side controller 1 provides the second control signal Sc2 to the signal-receiving terminal FBs of the secondary-side controller 5 through the second optocoupler 8 so that the secondary-side controller 5 enters the enabled state to enable the first optocoupler 6, and the primary-side controller 1 receives the first feedback signal Sfb1 provided by the first optocoupler 6. In one embodiment, although signals at the input terminal and the output terminal of the first optocoupler are not the same (for example, the current Ic and the first feedback signal Sfb1 shown in FIG. 2B), the two signals are corresponding signals. Therefore, unless otherwise specified in the present disclosure, they can be regarded as the same signal. For example, but not limited to, in the description of "the secondary-side controller 5 provides the first feedback signal Sfb1" and "the first optocoupler 6 couples the first feedback signal Sfb1 to the primary-side controller 1", the first feedback signal Sfb1 can be regarded as the same signal, and so on. On the other hand, the same is true for the second control signal Sc2 received/provided by the second optocoupler 8, which will not be described again here.

Figure 8:
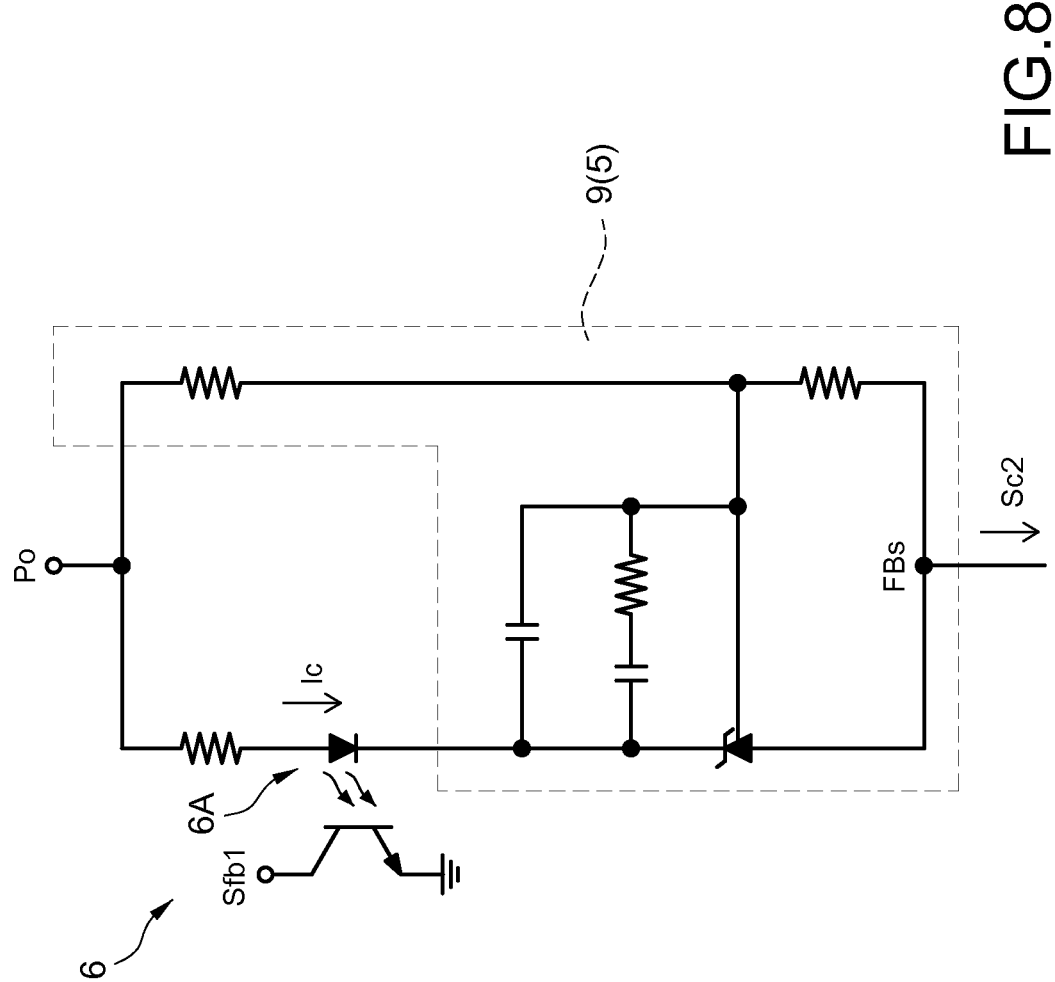
FIG. 8 is a block circuit diagram of a voltage regulation circuit applied to the power converter according to the sixth embodiment of the present disclosure.

Please refer to FIG. 8, which shows a block circuit diagram of a voltage regulation circuit applied to the power converter according to the sixth embodiment of the present disclosure, and also refer to FIG. 2A to FIG. 7. The embodiment of FIG. 8 may preferably be applied to the power converter 100 of the sixth embodiment of FIG. 7. In FIG. 8, the secondary-side controller 5 may be, for example, but not limited to, a voltage regulation circuit 9 formed by a TL431 voltage regulator and specific passive circuit components (i.e., resistors, capacitors, etc.), which may mainly serve as a compensation circuit for type I to type III. A negative polarity of the voltage regulation circuit 9 is the signal-receiving terminal FBs, and is coupled to the second optocoupler 8. When the second optocoupler 8 couples the second control signal Sc2 to the signal-receiving terminal FBs, and the voltage received by the signal-receiving terminal FBs is at a high level, the voltage regulation circuit 9 is unavailable to cause the secondary-side controller 5 to be in the shutdown state to disable the first optocoupler 6. On the contrary, when the second optocoupler 8 couples the second control signal Sc2 to the signal-receiving terminal FBs, and the voltage received by the signal-receiving terminal FBs is not at a high level, the voltage regulation circuit 9 is available to cause the current Ic flowing through the optocoupler diode 6A of the first optocoupler 6 to enable the first optocoupler 6. Therefore, the primary-side controller 1 receives the first feedback signal Sfb1 provided by the first optocoupler 6.

In one embodiment, the features of FIG. 2A to FIG. 8 can be applied to each other. For example, the secondary-side controller 5 of the power converter 100 of FIG. 2A may apply the second optocoupler 8 and voltage regulation circuit 9 of the embodiments of FIG. 7 to FIG. 8 so that when the secondary-side controller 5 determines that the output current Io is lower than the current threshold through the current signal Si, the current signal Si disables the TL431 voltage regulator, and the first optocoupler 6 notifies the primary-side controller 1. When the primary-side controller 1 determines that the output current Io is not less than the current threshold according to the second voltage level of the second feedback signal Sfb2, the primary-side controller 1 enables the voltage regulation circuit 9 through the second optocoupler 8. Based on the above illustrative example, no further description is provided here.

Please refer to FIG. 9, which shows a flowchart of a feedback control method of the power converter according to the present disclosure, and also refer to FIG. 1A to FIG. 8. The feedback control method disclosed in the present disclosure is mainly to reduce the power consumption of the power converter 100 when operating in the light-load condition or the no-load condition. Therefore, when the power converter 100 of the present disclosure operates in the light-load condition, the feedback method of the power converter 100 will be changed. Before entering the feedback control method, the primary-side controller 1 and the secondary-side controller 5 need to be started first. When the power converter 100 receives the input power source Pin, the primary-side controller 1 performs high-voltage startup based on the input power source Pin. After the high-voltage startup, the primary-side controller 1 starts to provide the first control signal Sc1 to the primary-side circuit 2 so that the primary-side circuit 2 converts the energy of the input power source Pin. Afterward, the primary-side circuit 2 couples the converted energy to the primary-side winding circuit 3 so that the primary-side winding circuit 3 provides the auxiliary voltage Vaux to the primary-side controller 1 to complete the startup of the primary-side controller 1. The primary-side circuit 2 also couples the converted energy to the secondary-side circuit 4. The secondary-side controller 5 receives the energy coupled to the secondary-side circuit 4 to operate, and controls the secondary-side circuit 4 to convert the energy coupled to the secondary-side circuit 4 into the output power source Po. Thereby, the power converter 100 can start to perform the operation of the feedback control method based on the magnitude of the output current Io.

Afterward, the secondary-side controller generates the first feedback signal according to the DC output signal of the power converter, and provides the first feedback signal to the primary-side controller through the first optocoupler (S100). After the power converter 100 receives the input power source Pin and the primary-side controller 1 and the secondary-side controller 5 normally start, the secondary-side controller 5 provides the first feedback signal Sfb1 to the primary-side controller 1 (i.e., a conventional feedback control) at least once or for a short period of time (for example, but not limited to, 3-5 μs).

Afterward, the primary-side winding circuit provides the second feedback signal corresponding to the DC output signal to the primary-side controller (S200). Since the auxiliary voltage Vaux has a linear relationship with the output power source Po, and the DC output signal So also has a corresponding relationship with the output power source Po, the primary-side controller 1 can receive the second feedback signal Sfb2 corresponding to the DC output signal So from the primary-side winding circuit 3 so that the primary-side controller 1 can use the second feedback signal Sfb2 to control the power converter 100 at any time. When it is not necessary to control the power converter 100 using the second feedback signal Sfb2, the second feedback signal Sfb2 can be used to monitor the output power source Po. Alternatively, when it is not necessary to control the power converter 100 using the second feedback signal Sfb2, a pin that receives the second feedback signal Sfb2 can be disabled.

Afterward, the primary-side controller generates the first control signal according to the first feedback signal, and the first control signa is used to control the primary-side circuit (S300). The primary-side controller 1 adjusts the first control signal Sc1 of the primary-side circuit 2 based on the first feedback signal Sfb1, and the power converter 100 can be controlled to provide a stable output power source Po by adjusting the first control signal Sc1.

After that, the power converter 100 can selectively enter the low-loss mode according to the magnitude of the output current Io. Therefore, when the primary-side controller realizes that the output current of the power converter is lower than the current threshold, it generates the first control signal based on the second feedback signal (S400). When the primary-side controller 1 realizes that the output current Io of the power converter 100 is lower than the current threshold, it means that the power converter 100 operates in a light-load condition or a no-load condition. Therefore, the primary-side controller 1 can receive the second feedback signal Sfb2 corresponding to the auxiliary voltage Vaux through the primary-side winding circuit 3 so that the primary-side controller 1 generates the first control signal Sc1 based on the second feedback signal Sfb2. Accordingly, devices and circuits (for example, but not limited to, the secondary-side controller 5 and the first optocoupler 6) that are not in use can be disabled or put into the sleep state to save power consumption when the power converter 100 operates in the light-load condition. In particular, the detailed operation steps and methods of the power converter 100 can be referred to FIG. 1A to FIG. 8, and will not be described again here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. A power converter, comprising:
a primary-side circuit,
a primary-side controller coupled to the primary-side circuit, and configured to generate a first control signal according to a first feedback signal,
a primary-side winding circuit coupled to the primary-side controller, and configured to generate a second feedback signal, wherein the primary-side circuit comprises an AC-to-DC circuit and a primary-side coil,
a secondary-side circuit, wherein the secondary-side circuit comprises a secondary-side coil and a rectification-filter circuit,
a secondary-side controller coupled to the secondary-side circuit, and configured to generate the first feedback signal according to a DC output signal, and
a first optocoupler coupled to the secondary-side controller and the primary-side controller, and configured to provide the first feedback signal to the primary-side controller, and
a period detection circuit coupled to the secondary-side coil and the secondary-side controller,
wherein the primary-side controller is configured to provide the first control signal to control the primary-side circuit according to the first feedback signal, and when the primary-side controller realizes that an output current of the power converter is less than a current threshold, the primary-side controller is configured to generate the first control signal according to the second feedback signal, and wherein the period detection circuit is configured to detect a voltage conduction period of the secondary-side coil to correspondingly provide a period signal, and the secondary-side controller is configured to determine whether the output current is less than the current threshold according to the period signal.

2. The power converter as claimed in claim 1, wherein when the output current is less than the current threshold, the secondary-side controller enters a sleep state or a shutdown state to disable the first optocoupler.

3. The power converter as claimed in claim 1, wherein the primary-side winding circuit comprises:
an auxiliary winding coupled to the primary-side coil, and
a voltage division circuit coupled to the auxiliary winding in parallel, and the voltage division circuit comprising a first resistor and a second resistor connected in series,
wherein a primary-side feedback terminal of the primary-side controller is coupled between the first resistor and the second resistor, and receives the second feedback signal.

4. A feedback control method of a power converter, the power converter comprising a primary-side circuit, a primary-side controller, a primary-side winding circuit, a secondary-side controller, a first optocoupler, and a secondary-side coil, the feedback control method comprising steps of:
generating, by the secondary-side controller, a first feedback signal according to a DC output signal of the power converter, and providing the first feedback signal to the primary-side controller through the first optocoupler,
providing, by the primary-side winding circuit, a second feedback signal corresponding to the DC output signal to the primary-side controller,
generating, by the primary-side controller, a first control signal according to a first feedback signal to control the primary-side circuit through the first control signal,
generating the first control signal according to the second feedback signal when the primary-side controller realizes that an output current of the power converter is less than a current threshold,
detecting a voltage conduction period of the secondary-side coil to provide a period signal,
determining, by the secondary-side controller, that the output current is less than the current threshold according to the period signal, and the power converter is in a light-load state,
notifying, by the secondary-side controller, the light-load state to the primary-side controller through the first feedback signal,
disabling the first optocoupler when the secondary-side controller enters a sleep state or a shutdown state, and
generating, by the primary-side controller, the first control signal according to the second feedback signal.

* * * * *